United States Patent [19]

Miyake

[11] Patent Number: 4,653,622
[45] Date of Patent: Mar. 31, 1987

[54] CREEP PREVENTION CONTROL DEVICE FOR AUTOMATIC TRANSMISSION APPARATUS FOR MOTOR VEHICLES

[75] Inventor: Junichi Miyake, Saitama, Japan

[73] Assignee: Honda Giken Kogyo Kabushiki Kaisha, Tokyo, Japan

[21] Appl. No.: 686,354

[22] Filed: Dec. 26, 1984

[30] Foreign Application Priority Data

Dec. 26, 1983 [JP] Japan .................. 58-249770

[51] Int. Cl.$^4$ .................................... B60K 41/18
[52] U.S. Cl. .................................... 192/0.052; 74/866
[58] Field of Search ............... 74/866, 867, 855, 856, 74/862, 861, 877, 844; 192/0.052, 0.09, 0.092, 0.094, 3.58, 0.076

[56] References Cited

U.S. PATENT DOCUMENTS

| | | | |
|---|---|---|---|
| 4,313,353 | 2/1982 | Honig | 74/867 X |
| 4,478,108 | 10/1984 | Nishimura et al. | 74/867 X |
| 4,501,173 | 2/1985 | Honig | 74/867 X |
| 4,503,733 | 3/1985 | Hasegawa | 74/866 X |
| 4,513,638 | 4/1985 | Nishikawa | 74/866 |
| 4,513,639 | 4/1985 | Hiramatsu | 74/866 |
| 4,526,065 | 7/1985 | Rosen et al. | 74/867 X |

FOREIGN PATENT DOCUMENTS

| | | | |
|---|---|---|---|
| 3019274 | 11/1981 | Fed. Rep. of Germany | 74/866 |
| 0088250 | 5/1983 | Japan | 74/844 |

*Primary Examiner*—Leslie Braun
*Assistant Examiner*—David Novais
*Attorney, Agent, or Firm*—Armstrong, Nikaido, Marmelstein & Kubovcik

[57] ABSTRACT

A creep prevention control device for an automatic transmission apparatus for a motor vehicle. The creep prevention control device has a mechanism for preventing creep caused by the automatic transmission apparatus and a mechanism for increasing the idling speed of an engine of the motor vehicle. These mechanisms are controlled on the basis of signals generated by sensors for detecting operating conditions of the motor vehicles and indicative of the detected operating conditions. The mechanism for increasing the engine idling speed is actuated when rendering the creep preventing mechanism inoperative so that the creep prevention can timely be controlled and the engine can idle in an optimum condition at all times.

3 Claims, 6 Drawing Figures

CREEP PREVENTION CONTROL DEVICE FOR AUTOMATIC TRANSMISSION APPARATUS FOR MOTOR VEHICLES

BACKGROUND OF THE INVENTION

1. Field of the Invention

The present invention relates to an automatic transmission apparatus for motor vehicles which has a creep prevention mechanism, and more particularly to a creep prevention control device for the creep prevention mechanism.

2. Description of the Prior Art

Many motor vehicls or automobiles are equipped with automatic transmission apparatus in recent years. Although several types of automatic transmission apparatus are available for use on motor vehicles, most automatic transmission apparatus in use today comprise a torque converter and a gear mechanism having a plurality of selectively usable gear trains. The gear trains are automatically selected according to patterns assigned respectively to shift lever positions such as a drive position D, a manual low position L, a reverse position R, a neutral position N, and other positions. No gear train is selected in the neutral position N of the shift lever.

It is known that when the shift lever is in the drive position D while the engine is idling, some motor vehicles with such automatic transmission apparatus are slowly moved, a phenomenon known as so-called creep. The automatic transmission apparatus for such automobiles employ a clutch coupled to a first gear train for controlling power transmission through the first gear train. The clutch is constructed such that it can transmit engine power by being supplied with oil under pressure. The creep is caused since this clutch is not completely disconnected. The automobiles suffering the creep are disadvantageous in that the engine is subjected to a load when the motor vehicle is at rest.

To prevent the creep from being caused, there has been developed an automatic transmission apparatus having a creep prevention mechanism for releasing the pressure of the working oil from the first-gear-train clutch when the engine is idling and the motor vehicle is at rest. In such an automatic transmission apparatus, however, it is difficult to effect creep prevention at desired timing at all times. Another drawback with the developed automatic transmission apparatus is that there is a wide difference between an engine idling speed at the time the transmission apparatus is in a creep prevention mode and an engine idling speed at the time the transmission apparatus is not in the creep prevention mode.

SUMMARY OF THE INVENTION

The present invention has been made in an effort to solve the foregoing, prior difficulties.

It is an object of the present invention to provide a creep prevention control device for an automatic transmission apparatus for motor vehicles which has a creep prevention mechanism, the creep prevention control device being capable of effecting creep prevention at optimum timing based on detected signals indicative of operating conditions of the motor vehicle and also capable of increasing the engine idling speed to enable the motor vehicle to start moving smoothly in order to prevent the speed of engine rotation from being reduced due to a load imposed on the torque converter when the transmission apparatus is released from the creep prevention mode.

According to the present invention, a creep prevention device in an automatic transmission apparatus for a motor vehicle includes means for preventing creep caused by the automatic transmission apparatus, sensor means for detecting operating conditions of the motor vehicle and generating signals indicative of the detected operating conditions, means for increasing the idling speed of an engine of the motor vehicle, and control means responsive to the signals from the sensor means for controlling the creep preventing means and the idling speed increasing means so as to operate the idling speed increasing means when rendering the creep preventing means inoperative.

The above and further objects, details and advantages of the present invention will become apparent from the following detailed description of preferred embodiments thereof, when read in conjunction with the accompanying drawings.

DESCRIPTION OF THE PREFERRED EMBODIMENTS

Figure 1:
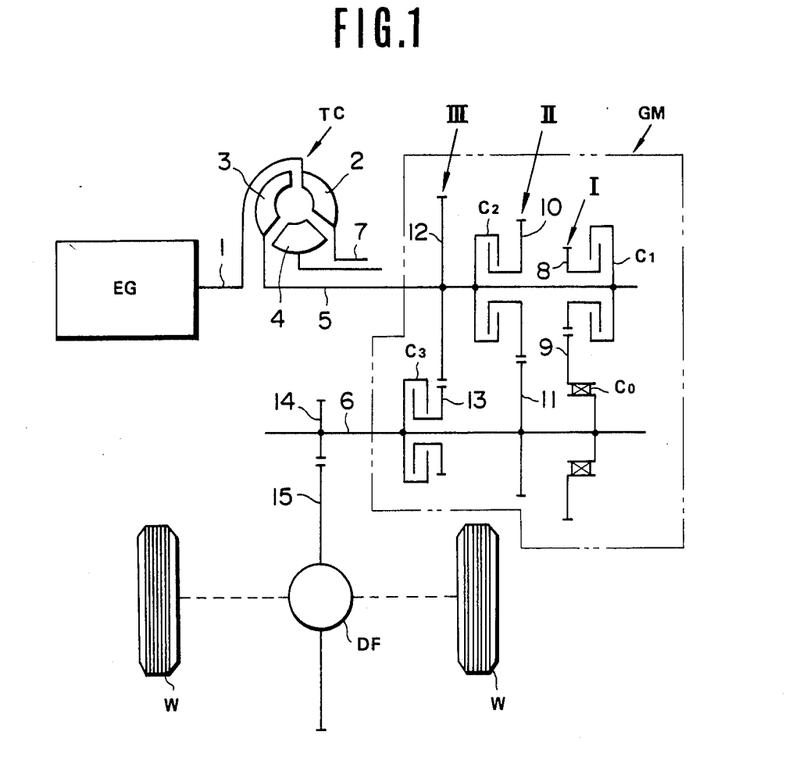
FIG. 1 is a schematic diagram of a power transmission system in an automatic transmission apparatus for a motor vehicle, in which a creep prevention control device of the present invention is incorporated.

FIG. 1 illustrates a power transmission system in an automatic transmission apparatus for a motor vehicle. In the illustrated power transmission system, power produced by an engine EG through a crank shaft 1 is transmitted via a torque converter TC, a gear mechanism GM, and a differential unit DF to drive wheels W.

The torque converter TC comprises a known fluid torque converter composed of an impeller 2 coupled to the crank shaft 1, a turbine 3 coupled to an input shaft 5 of the gear mechanism GM, and a stator 4. Torque transmitted from the crank shaft 1 to the impeller 2 is transferred through the intermediary of a fluid to the turbine 32.

The gear mechanism GM has the input shaft 5, an output shaft 6 parallel thereto, a first gear train I, a second gear train II, and a third gear train III, these gear trains being mounted on the input and output shafts 5, 6 parallel to each other. The first gear train I is composed of a drive gear 8 coupled to the input shaft 5 through a clutch $C_1$ serving as a frictional engagement element, and a driven gear 9 coupled to the output shaft 6 through a one-way clutch $C_0$. The second gear train II is composed of a drive gear 10 coupled to the input shaft 5 through a clutch $C_2$, and a driven gear 11 coupled to the output shaft 6 and meshing with the drive gear 10. The third gear train III is composed of a drive gear 12 coupled to the input shaft 5 and a driven gear 13 coupled to the output shaft 6 through a clutch $C_3$ and meshing with the drive gear 12.

When only the clutch $C_1$ is connected in the gear mechanism GM, the drive gear 8 is connected to the input shaft 5 to establish a power transmission path on the first gear train I through which torque is transmitted from the input shaft 5 to the output shaft 6. When the clutch $C_2$ is then connected while the clutch $C_1$ remains connected, the drive gear 10 is connected to the input shaft 5 to establish a power transmission path on the second gear train II through which torque is transmitted from the input shaft 5 to the output shaft 6. Since the output shaft 6 rotates at a higher speed than the speed of rotation of the driven gear 9 of the first gear train I due to the difference between speed-change ratios of the first and second gear trains I, II, the one-way clutch $C_0$ rotates to cause the first gear train I to idle. When the clutch $C_2$ is disconnected and the clutch $C_3$ is connected while the clutch $C_1$ remains connected, the driven gear 13 is connected to the output shaft 6 to establish a power transmission path on the third gear train III through which torque is transmitted from the input shaft 5 to the output shaft 6. At this time, the one-way clutch $C_0$ also rotates to idle the first gear train I. The torque transmitted to the output shaft 6 is transmitted from an output gear 14 on an end of the output shaft 6 to a final driven gear 14 of the differential unit DF. The gear mechanism GM also has a reverse gear train and a parking mechanism, which are however omitted from illustration in FIG. 1.

Figure 2:
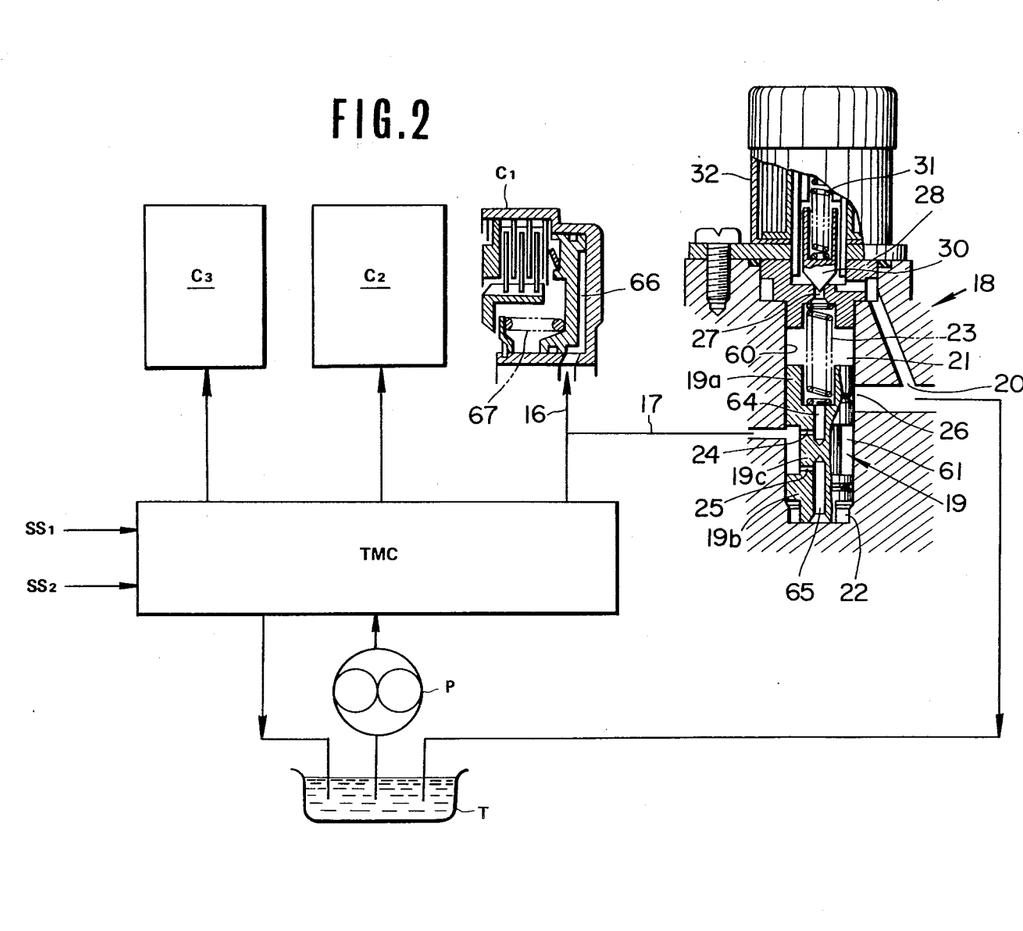
FIG. 2 is a schematic diagram of components of a hydraulic pressure system in the automatic transmission apparatus having a creep prevention mechanism used with the creep prevention control device of the invention, the illustrated components being associated with the creep prevention mechanism.

FIG. 2 shows a hydraulic pressure system for controlling the engagement and disengagement of the clutches $C_1$, $C_2$, $C_3$ in the gear mechanism GM dependent on the running conditions of the motor vehicle.

The hydraulic pressure system shown in FIG. 2 including a transmission control unit TMC serves to establish, one at a time, the power transmission paths on the first through third gear trains dependent on the running conditions of the motor vehicle by regulating, with a hydraulic pressure regulator valve or the like, the hydraulic pressure from a pump P driven by the input member of the torque converter TC, and thereafter applying the regulated hydraulic pressure as a working hydraulic pressure selectively to the clutches $C_1$, $C_2$, $C_3$ dependent on a speed-change pattern determined in advance by a vehicle-speed signal SS1 and a throttle opening signal SS2. The transmission control unit TMC is of a known construction and will not be described in detail.

A hydraulic pressure supply passage 16 is branched from the transmission control unit TMC to the clutch $C_1$ for the first gear train I. A branch passage 17 extending from the hydraulic pressure supply passage 16 is connected to a control valve 18 with a solenoid-operated valve for preventing creep caused by the automatic transmission apparatus.

The control valve 18 comprises a body having a cylindrical bore 60, a valve spool 19 slidably fitted in the cylindrical bore 60 and having an upper piston portion 19a, an intermediate smaller-diameter portion 19c, and a lower piston portion 19b, and a cap member 28 closing an upper end of the cylindrical bore 60 and having a central orifice 27 coacting with the solenoid-operated valve comprising a needle valve 30. The cylindrical bore 60 includes an upper oil chamber 21 defined above the upper piston portion 19a, a lower oil chamber 22 defined below the lower piston portion 19b, and an intermediate oil chamber 61 defined around the intermediate smaller-diameter portion 19c and communicating with the branch passage 17 at all times. The valve spool 19 is normally urged downwardly by means of a spring 23, and has a first communication passage 64 with an orfice 24 providing fluid communication between the upper oil chamber 21 and the intermediate oil chamber 61 and a second communication passage 65 with an orfice 25 providing fluid communication between the intermediate oil chamber 61 and the lower oil chamber 22. The solenoid-operated needle valve 30 is normally urged by means of a spring 31 to move downwardly to close the orifice 27 in the cap member 28. When a solenoid 32 mounted on the cap member 28 is energized, the needle valve 30 is displaced upwardly to open the orifice 27.

The control valve 18 will operate in a creep prevention mode as follows: When creep is to be prevented, the solenoid 32 is energized to attract the needle valve 30 upwardly against the force of the spring 31 to thereby open the orifice 27. The upper oil chamber 21 is brought into fluid communication with a return passage 20 connected to a reservoir tank T to release the pressure from the upper oil chamber 21 for thereby allowing oil under pressure supplied through the first communication passage 64 into the upper oil chamber 21 to be partially relieved from the orifice 27 into the return passage 20. At this time, the valve spool 19 is moved upwardly by oil supplied through the second communication passage 65 into the lower oil chamber 22 until the valve spool 19 counterbalances the resilient force of the spring 23. Now, a port 26 defined in the bore wall is opened to provide fluid communication between the branch passage 17 and the return passage 20 through the intermediate oil chamber 61 to permit the oil under pressure to flow from the branch passage 17 to the tank T without being subjected to any substantial resistance. The upward movement of the valve spool 19 is effectively limited by a restrictive resistance given by the orifice 25 of the second communication passage 65 for stably controlling the pressure in an oil chamber 66 in the first clutch $C_1$, which communicates with the branch passage 17. The force exerted by the oil pressure in the oil chamber 66 in the clutch $C_1$ is selected to be substantially equal to or slightly smaller than the force of a spring 67 in the clutch $C_1$, which tends to disconnect the clutch $C_1$. Therefore, the clutch $C_1$ is substantially disconnected or incapable of transmitting any torque at this time, and undesired creep of the motor vehicle can be prevented from occuring.

When the creep prevention mode is to be released, the solenoid 32 is de-energized to allow the needle valve 30 to move downwardly under the resiliency of the spring 31 to close the orifice 27, thereby preventing the oil under pressure from being relieved from the upper oil chamber 21. The valve spool 19 then starts moving downwardly slowly under the return force from the spring 23 while the oil pressure is being dampened by the orifices 24, 25 of the first and second communication passages 64, 65. The port 26 is then slowly closed to develop a gradual buildup of the working oil pressure in the oil chamber 66 in the clutch $C_1$ for thereby enabling the motor vehicle to start moving.

Figure 3:
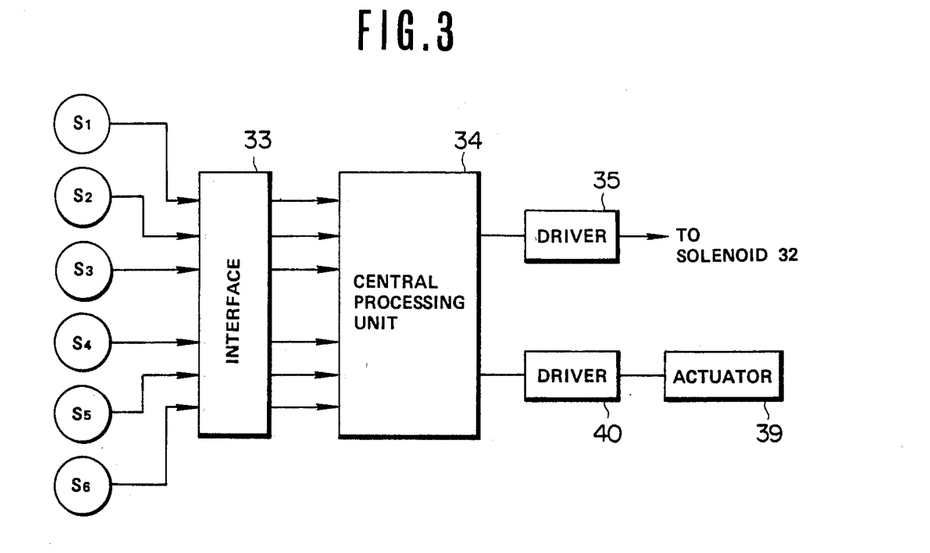
FIG. 3 is a block diagram of an overall fundamental arrangement of a creep prevention control device according to an embodiment of the present invention.

FIG. 3 shows a creep prevention control device for controlling the energization and de-energization of the solenoid 32 in the control valve 18 dependent on the operating conditions of the motor vehicle. The control device includes a shift position sensor $S_1$ for detecting whether a shift lever is in a drive position D or not, a water temperature sensor $S_2$ for detecting whether the temperaure of engine cooling water has reached a certan level or not, a vehicle speed sensor $S_3$ for detecting a running speed of the motor vehicle, a throttle sensor $S_4$ for detecting whether a throttle valve is in an idling position or not, an engine revolution sensor $S_5$ for detecting a rotational speed of the engine, a brake sensor $S_6$ for detecting whether a brake is actuated or not, a central processing unit (CPU) 34 for reading output signals from the sensors $S_1$ through $S_6$ through an input interface 33, effecting a logical determination to ascertain whether conditions for creep prevention are met or not, and issuing a control command to supply the working oil pressure to the first clutch $C_1$ dependent on the result of the logical determination, and a driver 35 for energizing or deenergizing the solenoid 32 in response to the control command from the CPU 34.

In operation, the CPU 34 is responsive to the output signals from the sensors $S_1$ through $S_5$ for determinining that the motor vehicle is about to come to a stop by confirming that the shift lever is in the drive position D, the temperature of the engine cooling water is higher than a certain prescribed temperature (for example, 65° C.), the vehicle speed is lower than a prescribed speed (for example, 18 km/h), the engine is idling or the throttle pedal is not depressed, the speed of rotation of the engine is lower than a prescribed speed (for example, 800 rpm), and the motor vehicle is braked. When the above conditions are met, the CPU 34 puts the automatic transmission apparatus in the creep prevention mode by applying a control command to the driver 35 to energize the solenoid 32 for relieving the working oil pressure from the clutch. If any one of the above conditions is not met, then the CPU 34 disables the creep prevention mode by applying a control command to the driver 35 to de-energize the solenoid 32 for supplying the working oil pressure again to the clutch.

With the motor vehicle having the above creep prevention control capability, it is possible in the creep prevention mode to keep an engine idling speed at a low level since the engine is free from any load which would otherwise subject the engine to creep, resulting in advantages in point of engine noise and fuel economy. Where the engine idling speed is kept at such a low level, however, another problem arises. That is, when the driver wants to start the motor vehicle slowly only by releasing the brake pedal without depressing the throttle pedal, the rotational speed of the engine is lowered and the engine rotation tends to become unstable since the torque converter undergoes a load upon releasing of the creep prevention mode.

To eliminate the above drawback, the control device of the present invention includes, as shown in FIG. 3, an actuator 39 for increasing the engine idling speed and a driver 40 for operating the actuator 39. When the CPU 34 detects that the brake is released during the creep prevention mode and issues a control command to the driver 35 to apply the working oil pressure to the clutch, the CPU 34 simultaneously applies a drive command to the driver 40 for enabling the actuator 39 to increase the engine idling speed.

In a creep prevention control device in which the brake pedal depression is not among the conditions to be met for entering the creep prevention mode, the CPU 34 may apply a drive command to the driver 40 at the same time that the CPU 34 issues a control command to release the creep prevention mode.

Where the foregoing control means for increasing the engine idling speed is employed, the rotational speed of the engine is prevented from being lowered at the time the automatic transmission device is released out of the creep prevention mode. Therefore, the motor vehicle can be started smoothly and stably even with the engine idling speed is kept low during the creep prevention mode.

The amount by which the engine idling speed is to be increased is selected to be substantially equal to such an extent which can compensate for any reduction in the rotational speed of the engine which would otherwise be caused by the load imposed on the torque converter upon slow starting of the motor vehicle. Accordingly, the engine idling speed is prevented from being increased far beyond the rotational speed of the engine during the creep prevention mode.

Figure 4:
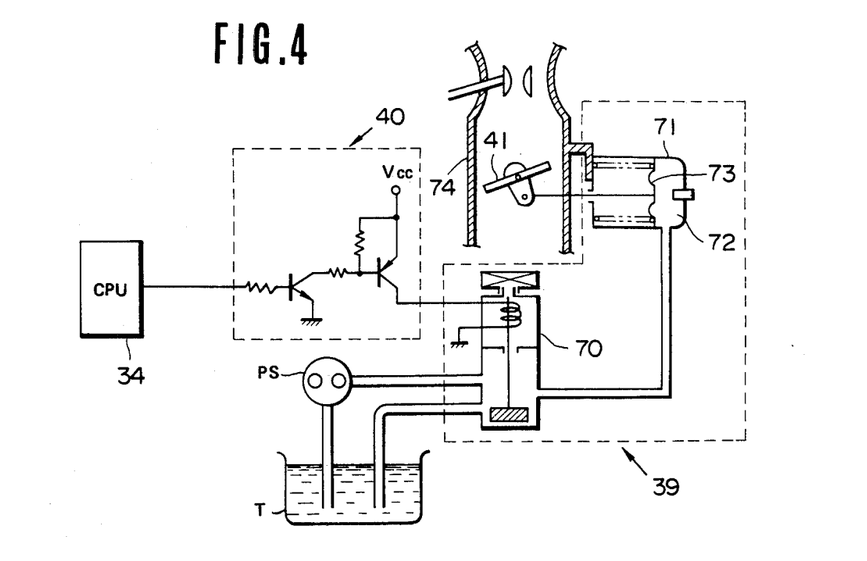
FIG. 4 is a schematic diagram of an actuator for increasing an engine idling speed, in the control device shown in FIG. 3.

FIG. 4 shows a specific construction of the actuator 39. The actuator 39 is connected to a hydraulic pressure source PS and has a solenoid-operated valve 70. The actuator 39 is thus hydraulically operable and also electrically operable. The actuator 39 includes a cylinder 71 having a working chamber 72 defined at one end by a diaphragm 73 having an output shaft. The working chamber 72 can selectively be brought by the solenoid-operated valve 70 into fluid communication with the pressure source PS and the reservoir tank T. When a drive command for increasing the engine idling speed is issued from the CPU 34, the solenoid of the solenoid-operated valve 70 is energized by the driver 40 to open the valve 70 for supplying oil pressure from the pressure source PS to the working chamber 72 in the cylinder 71. The output shaft of the diaphragm 73 is then projected out against the force of a return spring to increase the opening of a throttle valve 41 in a carburetor 74, whereupon the engine idling speed is increased. While no drive command is issued, the solenoid of the solenoid-operated valve 70 is de-energized and hence the working chamber 72 in the cylinder 71 is kept in fluid communication with the reservoir tank T. Therefore, the output shaft of the diaphragm 73 is retracted under the force of the return spring to maintain the throttle valve 41 in an idling position.

The motor vehicle is subjected at times to creep not only when the shift lever is in the drive position D but also when the shift lever is in a reverse position R to move the motor vehicle backwards or in a second-gear drive position $D_2$ to start the motor vehicle in a forward direction. To eliminate such creep, the same creep prevention mechanism as described above should be associated with each of the clutches for those gear positions in which creep would be caused. In addition, the same arrangement as above for increasing the engine idling speed should be provided for smoothly starting the motor vehicle in the reverse and second-gear drive positions R, $D_2$. With this arrangement employed, shift position sensors should be provided for detecting when the shift lever is in the reverse and second-gear drive positions R, $D_2$, respectively, or alternatively sensors should be provided for detecting when the clutches for the reverse and second-gear drive positions R, $D_2$ in the gear mechanism are engaged.

Figure 5:
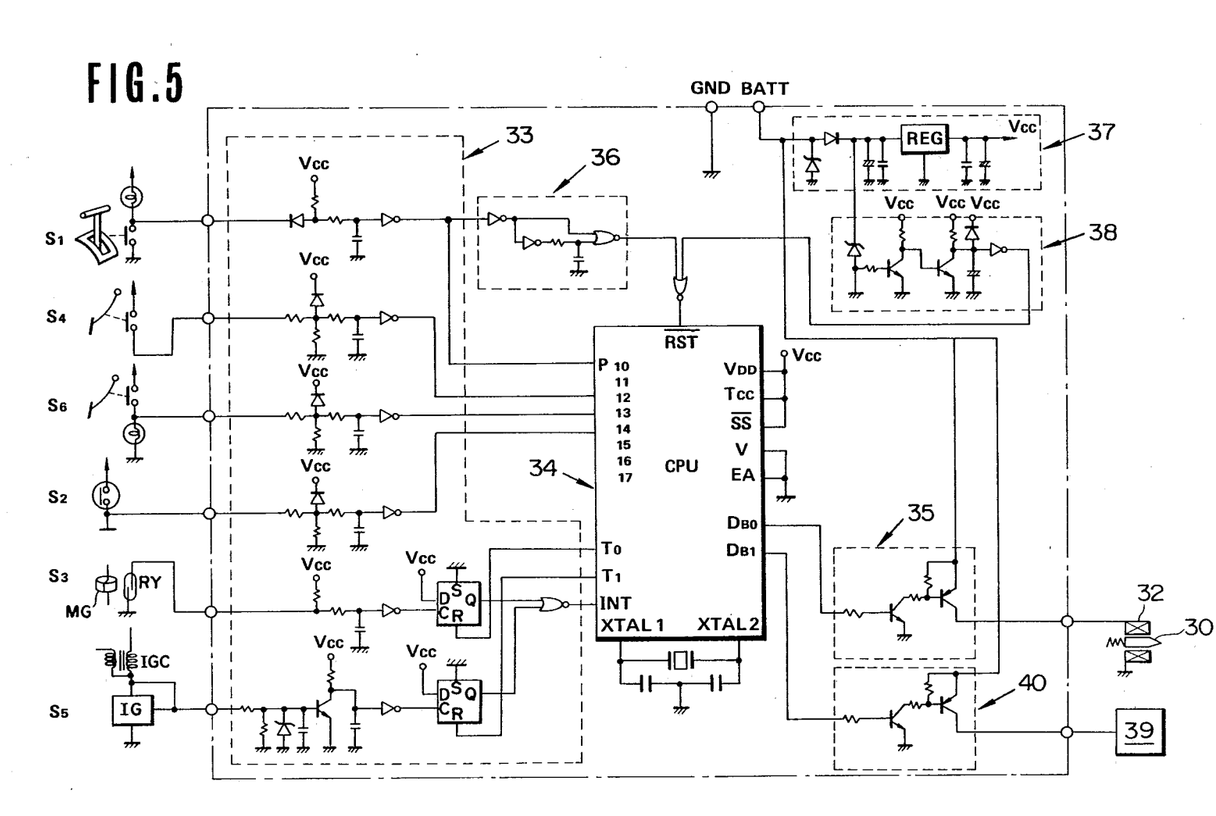
FIG. 5 is an electric wiring diagram of a specific circuit arrangement of the control device of FIG. 3, which includes a central processing unit (CPU)

FIG. 5 is illustrative of a circuit arrangement of the creep prevention control device of the invention. In the illustrated circuit arrangement, the shift position sensor $S_1$ comprises a switch which closes its contacts when the shift lever is put in the drive position D. The water temperature sensor $S_2$ comprises a switch which closes it contacts when the engine cooling water is higher than a certain temperature $T_s$. The throttle sensor $S_4$ comprises a switch which closes its contacts when the throttle pedal is depressed. The brake sensor $S_6$ comprises a swtich which closes its contacts when the brake pedal is depressed. The vehicle speed sensor $S_3$ comprises a reed relay RY which open and close its contacts in response to rotation of a permanent magnet MG attached to a speedometer cable. The engine revolution sensor $S_5$ comprises a means for picking up an ignition signal induced by an igniter IG across a primary winding of an ignition coil IGC. The CPU 34 detects a vehicle speed and a rotational speed of the engine by counting pulse signals issued from the sensors $S_3$, $S_5$ for a certain period of time. The input interface 33 shapes the waveforms of the output signals from the sensors and applies the shaped signals to the CPU 34. The circuit of FIG. 5 also includes a reset circuit 36 for issuing a reset signal to the CPU 34 upon elapse of a reset time determined by a time constant defined by a resistor and a capacitor, after an edge of the shift position detecting signal has been detected, a regulated power supply circuit 37 to which a battery BATT is connected through an ignition switch, and a reset circuit 38 for resetting the CPU 34 when the power supply is switched on.

Figure 6:
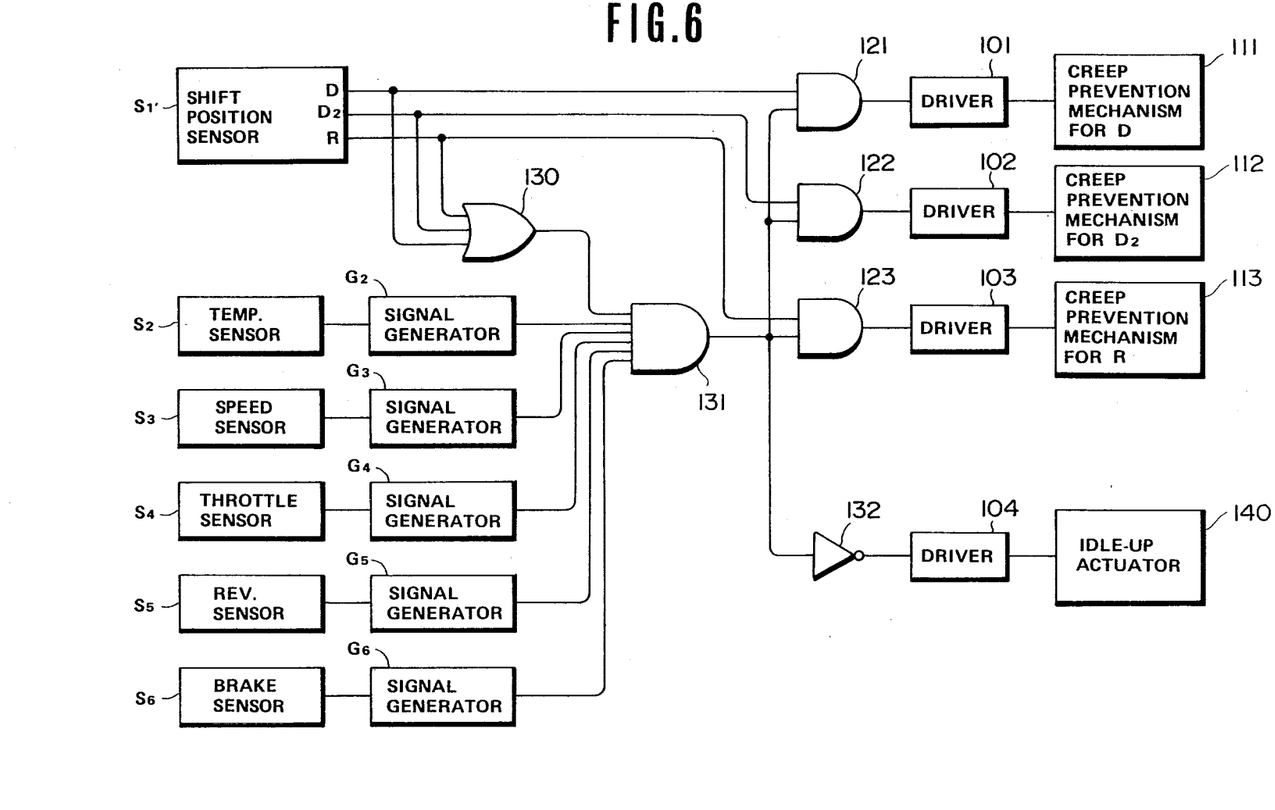
FIG. 6 is a block diagram of a creep prevention control device according to another embodiment of the present invention.

The creep prevention control device of the present invention may be fabricated without using a central processing unit. FIG. 6 shows another embodiment directed to an arrangement using no central processing unit.

The circuit arrangement shown in FIG. 6 has six snsors among which five sensors except a shift position sensor $S_1'$, that is, a water temperature sensor $S_2$, a throttle sensor $S_4$, a brake sensor $S_6$, a vehicle speed sensor $S_3$, and a revolution sensor $S_6$, are identical to the corresponding sensors in the embodiment of FIG. 5 and are connected to signal generators $G_2$ through $G_6$, respectively. The shift position sensor $S_1'$ is constructed such that when the shift lever is in one of the drive position D, the second-gear drive position $D_2$, and the reverse position R in which the vehicle would be subjected to creep, the shift position sensor $S_1'$ generates a high-level signal from a corresponding one of output terminals thereof. The output terminals of the shift position sensor $S_1'$ are connected through AND gates 121, 122, 123 respectively to drivers 101, 102, 103 associated with creep prevention mechanisms 111, 112, 113, and also connected respectively to input terminals of an OR gate 130. The signal generators $G_2$, $G_6$ connected to the water temperature sensor $S_2$ and the brake sensor $S_6$, respectively, generate high-level signals when the switch contacts of the corresponding sensors are closed and low-level signals when the switch contacts of the corresponding sensors are open. The signal generator $G_4$ connected to the throttle sensor $S_4$ generates a high-level signal when the switch contacts of the throttle sensor $S_4$ are open and a low-level signal when the switch contacts of the throttle sensor $S_4$ are closed. The signal generator $G_3$ coupled to the vehicle speed sensor $S_3$ counts occurrences of contacting of the contacts of the reed relay of the vehicle speed sensor $S_3$, and generates a high-level signal when the rate of the contacting occurrences is smaller than a prescribed value and a low-level signal when the rate of the contacting occurrences is greater than the prescribed value. The signal generator $G_5$ coupled to the revolution sensor $S_4$ counts ignition signals picked up by the engine revolution sensor $S_5$, and generates a high-level signal when the rate of the ignition signals is smaller than a prescribed value and a low-level signal when the rate of the ignition signals is greater than the prescribed value.

The signal generators $G_2$ through $G_6$ and the OR gate 130 are connected to an AND gate 131 for feeding their output signals to the AND gate 131. The AND gate 131 generates a high-level output signal only when all of its input signals are high in level. The output signal from the AND gate 131 is supplied through a NOT circuit 132 to a driver 104 for driving an actuator 140 for increasing an engine idling speed and also supplied through ADD gates 121, 122, 123 respectively to drivers 101, 102, 103 for driving creep prevention mechanisms 111, 112, 113, respectively.

In the embodiment of FIG. 6, when all of required conditions are met, that is, when the shift lever is in one of the drive position D, the second-gear drive position $D_2$, and the reverse position R, the temperature of the engine cooling water is higher than a certain prescribed temperature (for example, 65° C.), the vehicle speed is lower than a prescribed speed (for example, 18 km/h), the engine is idling or the throttle pedal is not depressed, the speed of rotation of the engine is lower than a prescribed speed (for example, 800 rpm), and the motor vehicle is braked, one of the creep prevention mechanism which corresponds to the selected shift lever position. If at least one of the above conditions is not met, then none of the creep prevention mechanism are driven, but the actuator 140 is driven.

In the above embodiment, not all of the six sensors $S_1'$ through $S_6$ are necessary, but some of them may be selected for use, and the selected sensors should peferably include the shift position sensor and the brake sensor.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A creep prevention control device in an automatic transmission apparatus for use in a motor vehicle, comprising:
    (a) means for preventing creep caused by the automatic transmission apparatus;
    (b) sensor means for detecting operating conditions of the motor vehicle and generating signals indicative of the detected operating conditions;
    (c) means for increasing the idling speed of an engine of the motor vehicle;
    (d) control means responsive to the signals from said sensor means for controlling said creep preventing means and said idling speed increasing means so as to operate said idling speed increasing means when rendering said creep preventing means inoperative; and (e) wherein said idling speed increasing means includes,
  (1) a driving element electrically connected to a central processing unit of said control means,
  (2) a solenoid valve operatively connected to and responsive to said driving means, and
  (3) a cylinder having an operative chamber and a diaphragm operatively connected to and responsive to said solenoid valve, said cylinder being further connected to a throttle to control said throttle in response to operation of said solenoid valve.

2. A creep prevention control device according to claim 1, wherein said automatic transmission apparatus includes a gear mechanism having a gear train and a clutch associated therewith and actuatable under a hydraulic pressure acting on the clutch, said creep preventing means comprising a valve capable of releasing the hydraulic pressure from said clutch.

3. A creep prevention control device according to claim 1, wherein said sensor means includes a shift position sensor for detecting shift positions of said automatic transmission apparatus and a brake sensor for detecting when the motor vehicle is braked.

* * * * *